United States Patent
Benvenuto et al.

(10) Patent No.: US 9,764,706 B2
(45) Date of Patent: Sep. 19, 2017

(54) VEHICLE AIR DAM ASSEMBLY

(71) Applicant: FLEX-N-GATE CORPORATION, Urbana, IL (US)

(72) Inventors: Guido Benvenuto, LaSalle (CA); Geoffrey Brooks, Macomb, MI (US); David Shaw, New Market (CA); Wayne Doswell, Aurora (CA)

(73) Assignee: FLEX-N-GATE CORPORATION, Urbana, IL (US)

( * ) Notice: Subject to any disclaimer, the term of this patent is extended or adjusted under 35 U.S.C. 154(b) by 0 days.

(21) Appl. No.: 15/067,142

(22) Filed: Mar. 10, 2016

(65) Prior Publication Data

US 2016/0264086 A1  Sep. 15, 2016

Related U.S. Application Data

(60) Provisional application No. 62/131,190, filed on Mar. 10, 2015.

(51) Int. Cl.
*B60R 19/48* (2006.01)
*B62D 35/00* (2006.01)

(52) U.S. Cl.
CPC ............ *B60R 19/48* (2013.01); *B62D 35/008* (2013.01)

(58) Field of Classification Search
CPC ......... H01L 2924/00; H01L 2924/0002; H01L 2924/00014; H01L 2224/45124; H01L 2224/45144; Y10S 414/13; B62D 35/005; B60K 28/16; A01D 2101/00; A01D 34/64
USPC .............................. 293/117; 296/180.1, 180.5
See application file for complete search history.

(56) References Cited

U.S. PATENT DOCUMENTS

| | | | | |
|---|---|---|---|---|
| 3,618,998 A * | 11/1971 | Swauger | ............... | B62D 35/005 280/762 |
| 4,119,339 A * | 10/1978 | Heimburger | ......... | B62D 35/005 180/903 |
| 4,131,308 A * | 12/1978 | Holka | .................. | B62D 35/005 296/180.5 |
| 4,159,140 A * | 6/1979 | Chabot | ................ | B62D 35/005 105/1.3 |
| 4,582,351 A * | 4/1986 | Edwards | ................. | B60R 19/56 293/102 |
| 4,659,130 A * | 4/1987 | Dimora | ................ | B62D 35/005 293/118 |
| 4,683,974 A * | 8/1987 | Richardson | .............. | B60Q 1/52 180/274 |
| 4,770,457 A * | 9/1988 | Tomforde | ............ | B62D 35/005 293/117 |
| 4,951,994 A * | 8/1990 | Miwa | .................... | B62D 35/005 180/903 |
| 5,458,391 A * | 10/1995 | Ito | ........................ | B62D 35/005 296/180.1 |
| 6,209,947 B1 * | 4/2001 | Rundels | ............... | B62D 35/005 180/903 |
| 6,286,893 B1 * | 9/2001 | Presley | ................ | B62D 35/005 296/180.5 |

(Continued)

*Primary Examiner* — Kiran B Patel
(74) *Attorney, Agent, or Firm* — Foley & Lardner LLP

(57) ABSTRACT

A vehicle air dam assembly is provided which includes a motor, a drive linkage and an active air dam which can be deployed or stowed on a vehicle. The motor is mounted to a vehicle bumper. The drive linkage is coupled to the motor and is affixed to the vehicle bumper. The drive linkage includes a drive member and a biasing means. The active air dam may be coupled to the drive linkage via a four bar linkage.

6 Claims, 6 Drawing Sheets

(56) References Cited

U.S. PATENT DOCUMENTS

| | | | | |
|---|---|---|---|---|
| 7,661,753 | B2* | 2/2010 | Shinedling | B62D 35/005 296/180.5 |
| 8,702,152 | B1* | 4/2014 | Platto | B62D 35/005 296/180.1 |
| 9,067,526 | B2* | 6/2015 | Browne | B60Q 9/00 |
| 9,102,366 | B1* | 8/2015 | Kim | B62D 35/005 |
| 9,126,640 | B2* | 9/2015 | Hoelzel | B62D 35/005 |
| 9,376,143 | B2* | 6/2016 | Alavandi | B62D 25/08 |
| 2007/0063541 | A1* | 3/2007 | Browne | B62D 35/00 296/180.1 |
| 2007/0216194 | A1* | 9/2007 | Rober | B62D 35/005 296/180.1 |
| 2010/0140976 | A1* | 6/2010 | Browne | B62D 35/005 296/180.1 |
| 2013/0199172 | A1* | 8/2013 | Strom | F03G 7/065 60/527 |
| 2014/0060036 | A1* | 3/2014 | Gao | F01P 7/10 60/527 |
| 2015/0210325 | A1* | 7/2015 | Deangelis | B62D 35/02 296/180.1 |
| 2017/0088091 | A1* | 3/2017 | Ginn | B60R 21/34 |

* cited by examiner

VEHICLE AIR DAM ASSEMBLY

CROSS-REFERENCE TO RELATED APPLICATION

This application claims the benefit of U.S. provisional patent application identified as Application No. 62/131,190, filed Mar. 10, 2015 and is incorporated herein by reference.

BACKGROUND

The present invention relates generally to devices for improving vehicle aerodynamics, and more specifically to air dams for motor vehicles.

Many conventional motor vehicles, such as the modern day automobile include an air dam that is engineered to improve the aerodynamic characteristics of the vehicle body. A traditional air dam, which is sometimes referred to as an "air deflector" is mounted on the underside of the front-end structure of the vehicle body, extending downward into proximity with the roadway. Current air dam design is such that the air dam is positioned approximately 15 degrees from the ground wherein the contact point between the front tire and the ground is the vertex. Air dam improve the handling and control of the motor vehicle, increase fuel economy, and also improve the routing of air flow for cooling/heat exchange in the vehicle powertrain and air conditioning systems by managing the flow of turbulent air under and around the vehicle chassis and affecting internal flows.

As a vehicle moves forward at higher speeds, air flow underneath the vehicle is more likely to increase where a vehicle does not have an air dam. Air flow underneath a vehicle is not desirable because a vehicle may experience lift as well as air turbulence under the vehicle thereby reducing fuel efficiency and increasing aerodynamic drag.

Traditional air dams are generally fixedly suspended from underneath the front end structure of the vehicle. Air dams therefore redirect the air flow to the sides of the vehicle so as to minimize turbulence caused by irregular under carriage surfaces. However, such traditional air dams which are fixedly suspended from underneath the frontend structure may be damaged upon sporadic unintended impact with a curb, driveway, incline or other roadway obstruction.

SUMMARY

In at least one embodiment, a vehicle air dam assembly is provided which includes a motor, a drive linkage and an active air dam. The motor is mounted to a vehicle bumper. The drive linkage is coupled to the motor and is affixed to the vehicle bumper. The drive linkage includes a drive member and a biasing means. The active air dam may be coupled to the drive linkage via a four bar linkage.

In at least one embodiment, a vehicle air dam assembly is provided which includes a motor, a support bracket, a drive member, a sleeve, a biasing member disposed in the sleeve, and an active air dam coupled to the biasing means via a four bar linkage. The drive member may be coupled to the motor and the support bracket at a proximal end of the drive member. The biasing means, disposed in the sleeve, being affixed upon an upper member of the four bar linkage. The active air dam may be affixed to the four bar linkage such that the active air dam may be stowed and deployed.

BRIEF DESCRIPTION OF THE DRAWINGS

The present invention will now be described by way of example, with reference to the accompanying drawings.

DETAILED DESCRIPTION

Figure 1:
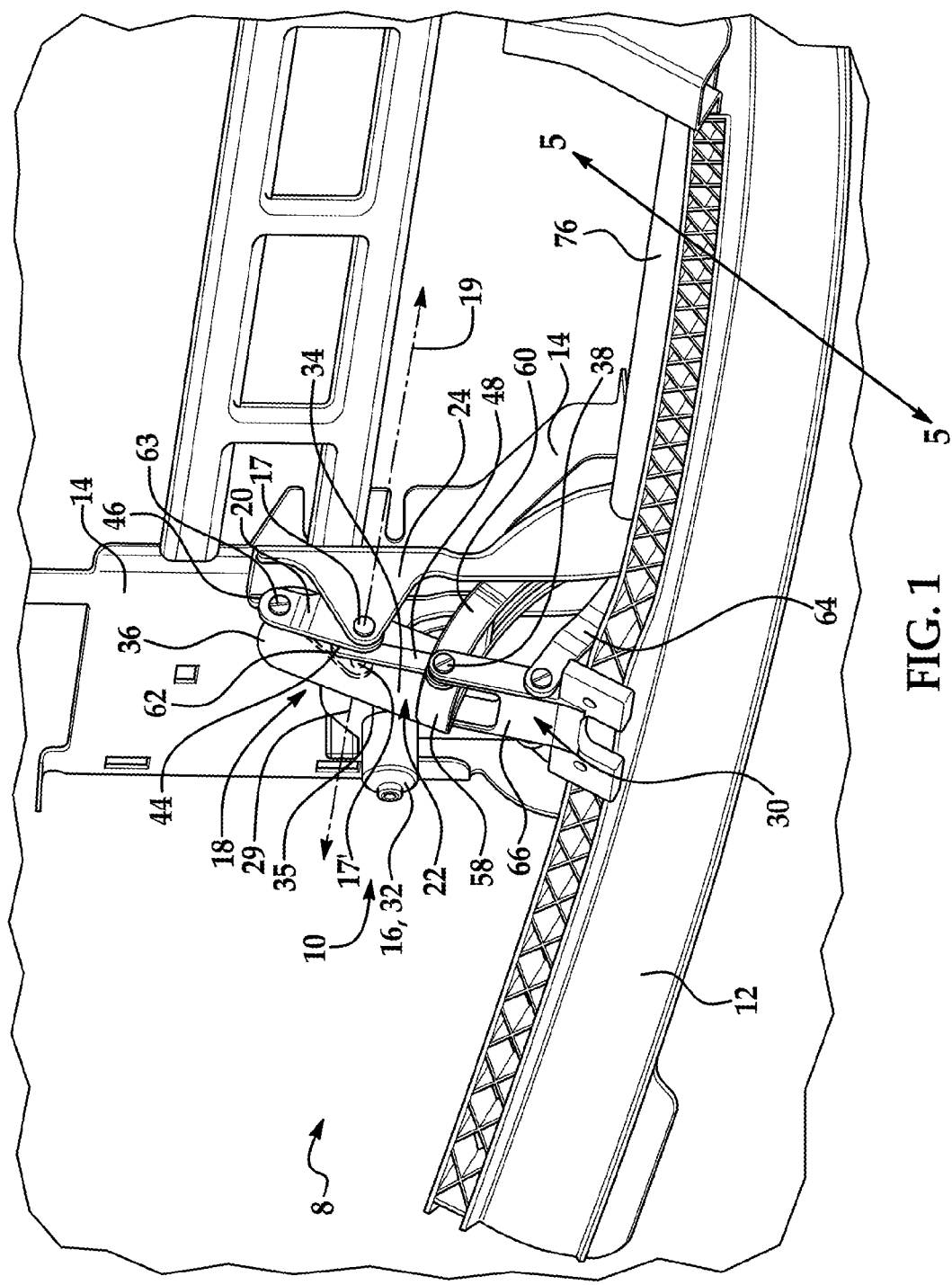
FIG. 1 is a partial isometric view of an embodiment of the vehicle air dam assembly when the air dam is in the stowed position.

The present disclosure provides a vehicle air dam assembly 8 having an active air dam 12 and an improved system linkage 10. The air dam 12 of the present disclosure may be supported at support bracket 24 and a corresponding support bracket (not shown). The corresponding support bracket is configured to be a duplicate of support bracket 24 with a corresponding system linkage (not shown). The corresponding support bracket (not shown) is affixed to the opposite end of the bumper system 14. A stabilizer bar 76 may connect the support bracket 24 to the corresponding support bracket. Each of the support bracket 24 and corresponding support bracket may be affixed to the bumper system 14 via mechanical fasteners, welding or the like.

With reference to FIG. 1, the system linkage 10 of the present disclosure includes an actuator 16, a four bar linkage 30 and a drive linkage 18. The support bracket 24 forms part of a four bar linkage 30 at the bottom end 42 of support bracket 24. The four bar linkage 30 is coupled to the active air dam 12 to translate the active air dam 12 from the stowed position (shown in FIG. 1) to the deployed position (shown in FIG. 3).

Figure 2:
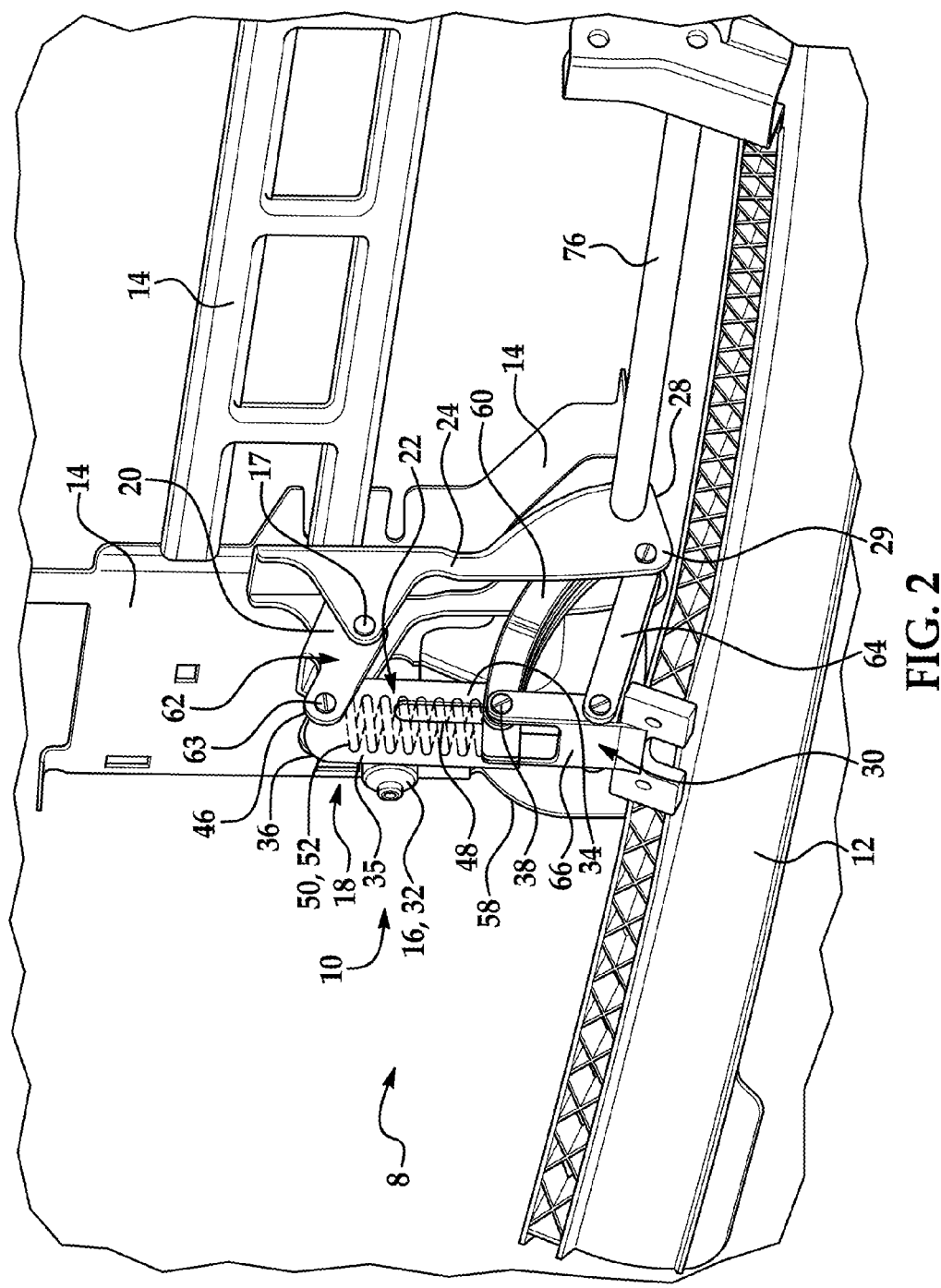
FIG. 2 is a partial isometric view of an embodiment of the vehicle air dam assembly of the present disclosure when the air dam is in the partially stowed position.
Figure 3:
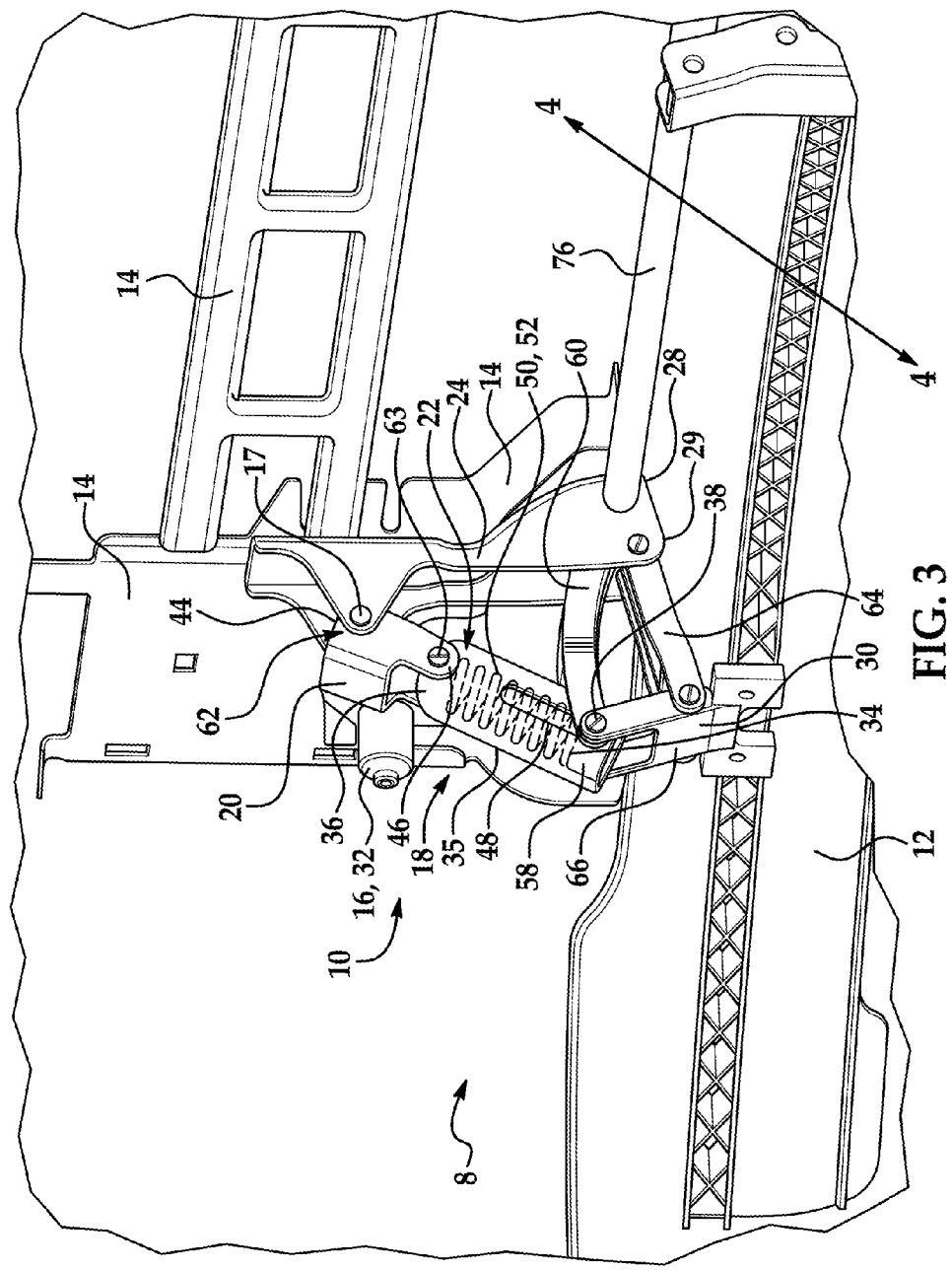
FIG. 3 is a partial isometric view of an embodiment of the vehicle air dam assembly of the present disclosure when the air dam is in the deployed position.

As indicated, the air dam 12 is connected to the bumper system 14 by means of a four bar linkage 30 wherein the support bracket 24 forms one of the bars in the four bar linkage 30. The four bar linkage 30 cooperates with the actuator 16 (shown as a motor 32) by means of the drive linkage 18. The drive linkage 18 is formed from a group of components which include, at a minimum, sleeve 35, spring 50 or biasing means 52, drive member 20, and support bracket 24. The drive linkage 18 rotates and translates the drive member 20 and the sleeve 35 (having the spring 50 or biasing member 52) as a result of the motor 32 or actuator 16 rotating drive member 20. Drive member 20 may be a C-like shaped bracket as shown in FIGS. 1-3. The drive member 20 may be pivotally coupled to the motor 32 at first pivot 62. It is understood that first pivot 62 may include first pivot pins 17 and 17' in addition to an axis of rotation (shown as 19 if FIGS. 1-3) about which drive member 20 rotates relative to support bracket 24 at first pivot 62 when the motor 32 or actuator 16 is operating the drive linkage 18.

Figure 9:
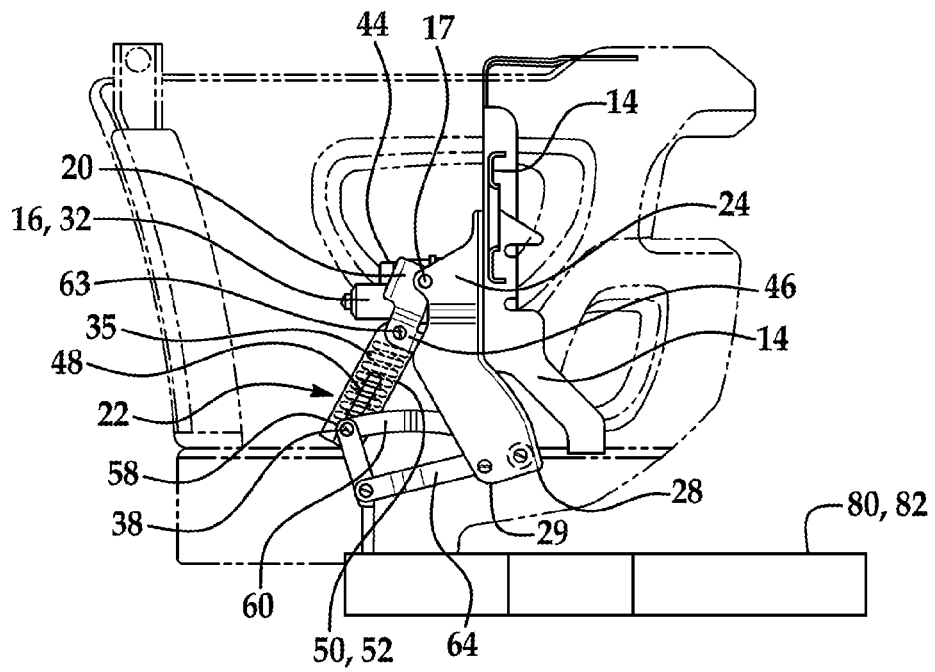
FIG. 9 is a cross sectional view of another embodiment of the present disclosure including a step.

Moreover, it is understood that each member of drive linkage 18 (sleeve 35, spring 50 or biasing means 52, drive member 20, and support bracket 24) and of the four bar linkage 30 may have varied geometries and lengths in order to obtain the desired deployment length or performance characteristics depending upon the application. Furthermore, with reference to FIG. 9, it is understood that an alternative deployment component 82 may be affixed to the four bar linkage 30 in lieu of active air dam 12 due to a change in the application. One non-limiting example may be the implementation of a step (schematically shown as telescoping step 80 in FIG. 9) instead of an active air dam 12 wherein the step 80 may deploy down and telescope out to assist a user to enter the vehicle. Again, it is understood that the geometry and lengths of the various members of the drive linkage and of the four bar linkage may be modified to obtain the desired deployment angle for the air dam 12 or alternative deployment component 82 (such as a step 80 or a storage box or the like).

Accordingly, the motor 32 is operatively configured to rotate and translate the drive member 20 of the drive linkage 18 such that the drive member 20 is in a stowed position (FIG. 1) and in a deployed position (FIG. 3). When the drive member 20 is in the stowed position, the active air dam 12 is stowed. Furthermore, when the drive member 20 is in the deployed position the active air dam 12 is also deployed in a semi-locked/downward position as shown in FIG. 3.

As shown, a lower member 22 is pivotally connected to the drive member 20 at second pivot 63. The lower member 22 includes a biasing means 52 disposed within a sleeve 35. One non-limiting example of the biasing means 52 may be a spring 50 as shown in FIGS. 1-8. It is also understood that other biasing means 52 may be implemented such as a hydraulic member (not shown) or the like.

With respect to the example of the spring 50 shown in FIGS. 1-8, the base 56 (shown in FIGS. 2 and 3) of the spring 50 is supported by a platform 58 that is pivotally affixed to the upper member 60 of the four bar linkage 30. It is further understood that platform 58 may, alternatively, be integral to the upper member 60 of the four bar linkage 30. Each platform pivot 38 of the four bar linkage 30 is further disposed in an elongated aperture 48 which may be defined on each side of the sleeve 35. This allows the four bar linkage 30 and the active air dam 12 to travel in the direction dictated by the elongated aperture 48 in the sleeve when a load 68 (shown in FIGS. 7 and 8) is applied to the active air dam 12. The sleeve 35 includes a lower end 34 and an upper end 36. As shown, the sleeve 35 is slidably engaged with each of the platform pivot 38 of the upper member 60 of the four bar linkage 30 via each elongated aperture 48. However, it is understood, that the spring 50 or biasing means 52 urges the upper member 60 toward the lower end 34 of the sleeve 35.

At the upper end 36 of the sleeve 35, the sleeve 35 is pivotally attached to a distal end 46 of the drive member 20. The drive member 20 is operatively configured to cooperate with the motor 32 such that the motor 32 drives the rotation of the drive member 20 about pivot 62 in support bracket 24. As shown, the drive member 20 is pivotally affixed to the left support bracket 24 at a proximal end 44 of the drive member 20.

The system is actuated by the actuator 16. The actuator 16 is shown as a motor 32 in FIGS. 1-8. The actuator 16 drives the rotation of the drive member 20. Rotation of the drive member 20 provides a mechanical advantage to the sleeve 35 and spring 20, which then drives the four-bar linkage 30. The four bar linkage 30 in conjunction with the sleeve 35 having the elongated aperture is designed to help translate the air dam 12 in a pre-determined motion as the air dam 12 deploys outward. As shown, the four bar linkage 30 is formed by the upper member 60, left support bracket 24, lower member 64, and aft member 66.

Figure 4:
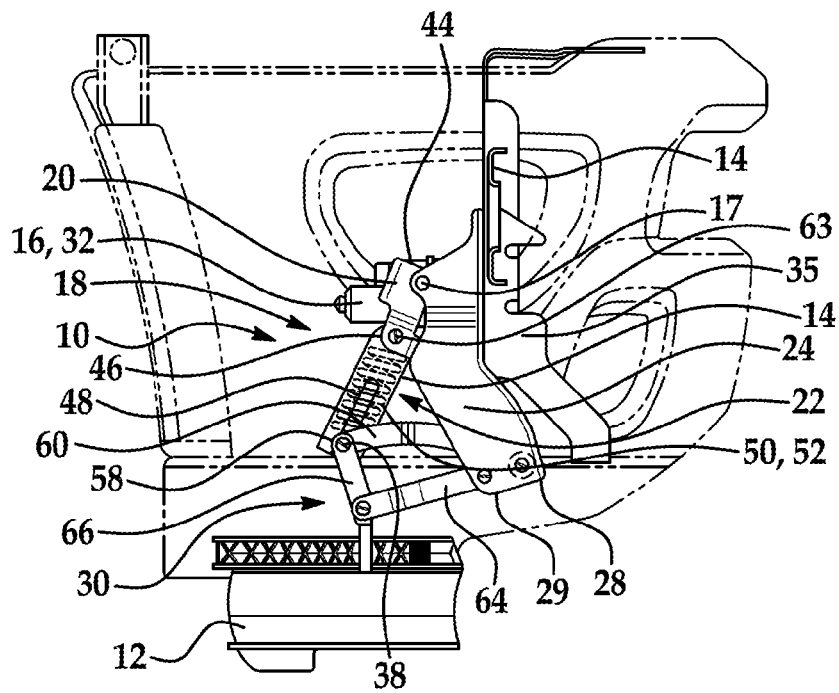
FIG. 4 is a cross sectional view along lines 4-4 in FIG. 3.
Figure 7:
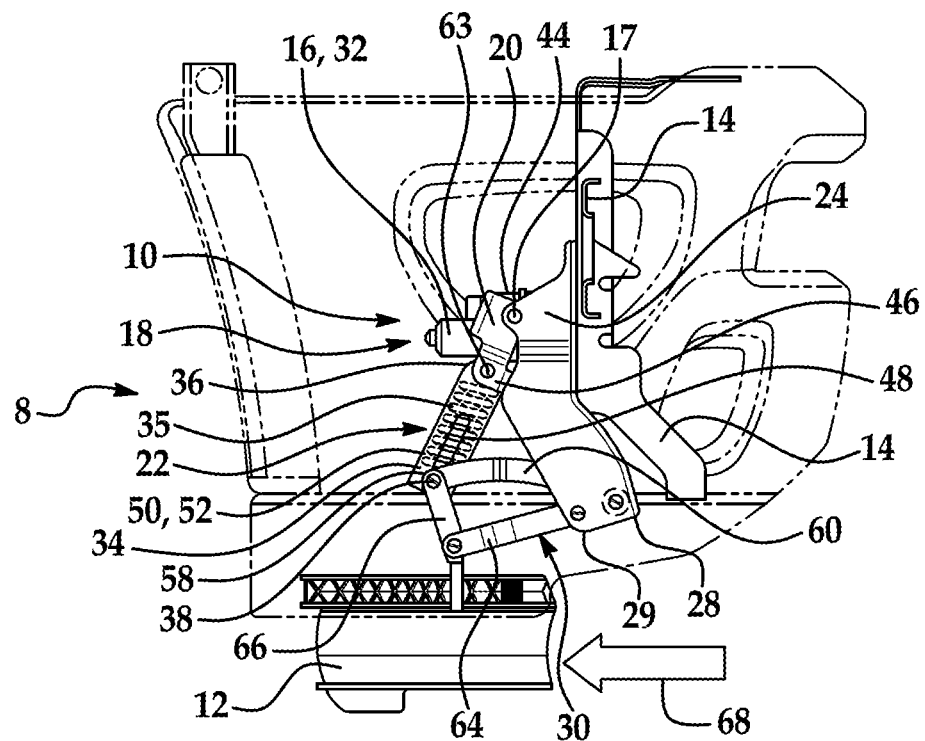
FIG. 7 is a cross sectional view of the vehicle air dam assembly as the frontal impact load is applied to the air dam.
Figure 8:
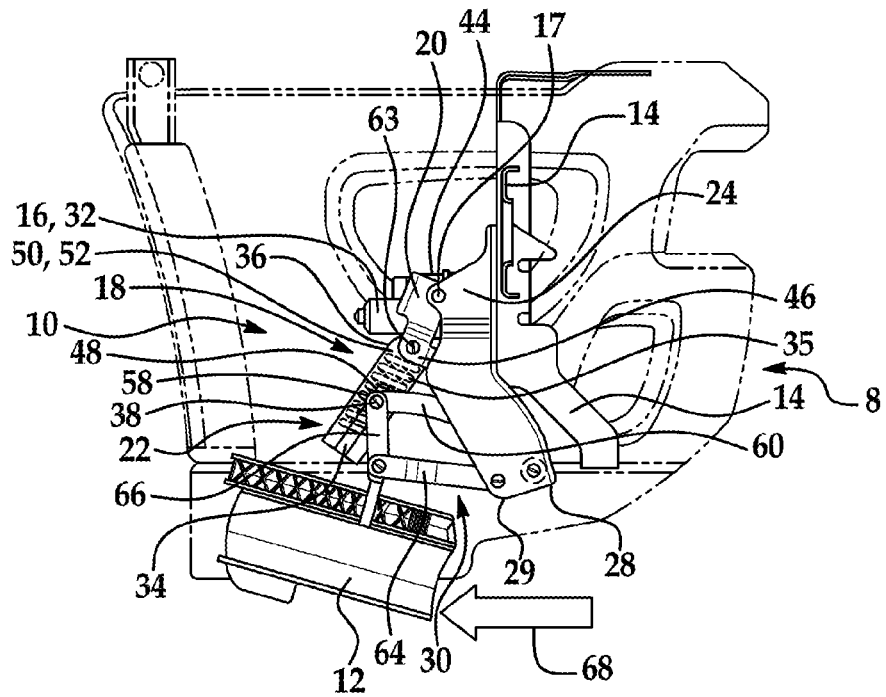
FIG. 8 is a cross sectional view of the vehicle air dam assembly absorbing energy from the frontal impact load.

With reference to FIGS. 4 and 7, the drive member 20 and active air dam 12 is shown in the fully deployed position. The system linkage 10 translates and rotates such that the drive member 20 rotates at or more than 180 degrees such that the air dam and the four bar linkage 30 are in a semi-locked position as shown in FIGS. 4-7. The extended rotation of the drive member 20 shown in FIGS. 4-7 provides for a means to maintain the drive member 20 in the downwardly rotated position (and prevent drive member 20 from inadvertently rotating upward) when a load is applied to the air dam 12. The active air dam 12 and the system linkage 10 absorb energy from the applied load 68 by allowing platform pivot 38 to translate along the elongated aperture 48 in sleeve 35 as shown in FIG. 8. The position of the drive member 20 is shown as being maintained in the downwardly rotated position in FIG. 8 and therefore, this mode is a semi-locked deployed position for the active air dam 12.

Figure 5:
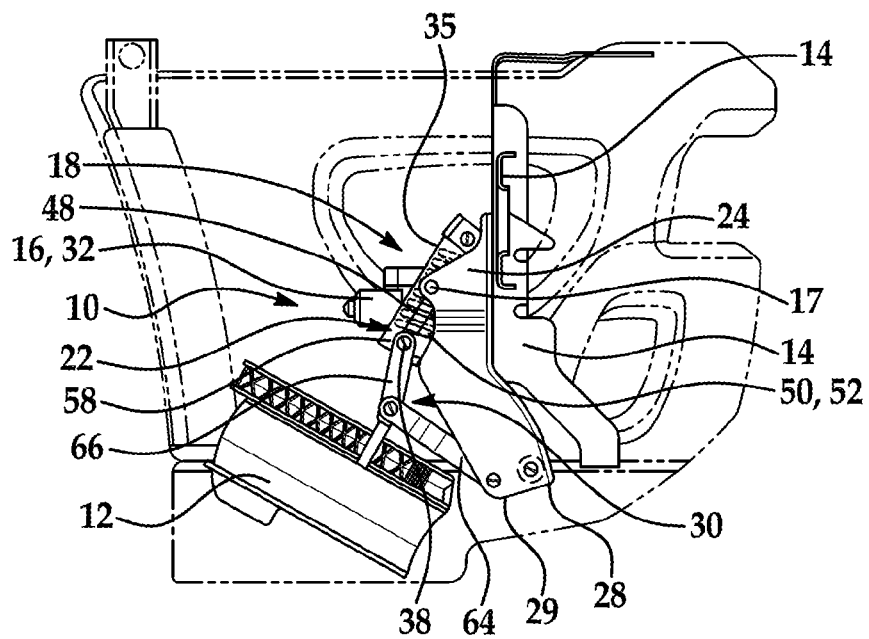
FIG. 5 is a cross sectional view of the vehicle air dam assembly along lines 5-5 in FIG. 1.
Figure 6:
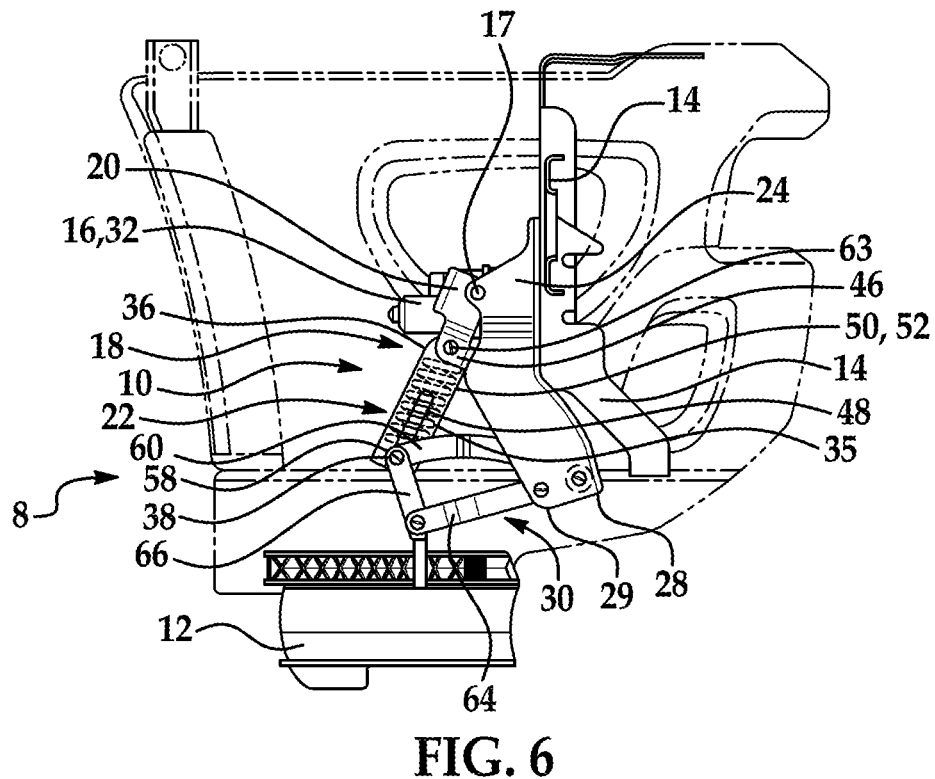
FIG. 6 is a cross sectional view of the vehicle air dam assembly prior to a receiving a frontal impact load.

With reference to FIGS. 4 and 5, the upper member 60 of the four bar linkage 30 is pivotally attached to the forefront base portion 28 of the support bracket 24. The lower member 64 is pivotally attached to the rearward base portion 29 of the support bracket 24 and the aft member 66 is pivotally attached to the upper member 60 and the lower member 64 as shown thereby creating a four bar linkage 30.

As previously indicated, the drive member 20 is operatively configured to be coupled with or cooperate with the motor 32 such that the motor 32 drives the rotation of the drive member 20 about pivots 17 and 17' and pivot joint 62 in the support bracket 24. The drive member 20 may be coupled to the motor 32 through means such as a rotating motor axis (schematically shown as 29 in FIG. 1) which is coupled to the drive member 20. As shown in FIG. 1, the drive member 20 is pivotally affixed to the support bracket 24 at a proximal end 44 of the drive member 20.

The drive linkage 18 holds the air dam 12 in the deployed position (shown in FIGS. 3, 6, and 8) without any load on the motor 32 because as the drive member 18 rotates to put the air dam 12 in the deployed position the drive member 18 rotates over and around the upper sleeve pivot 62 (as shown in FIG. 8) such that the system is mechanically interlocked to keep the air dam 12 deployed. Accordingly, in order to stow the air dam 12, the motor 32 must actuate the system so the drive member 20 rotates and returns to the stowed position (showed in FIG. 1) such that that the air dam 12 retracts and is stowed.

As shown in FIG. 8, the drive linkage 18 having the spring 50 allows the air dam 12 to stroke if impacted, thereby absorbing energy from an applied load 68 and preventing damage to the actuator 16 or motor 32. In the event of a load 68 to the air dam 12, the spring 50 in the lower drive link compresses and allows the air dam 12 to move in the direction of the pre-determined motion governed by the translation of each platform pivot 38 within each of elongated apertures 48 in the sleeve.

Accordingly, the system linkage 10 of the present disclosure further comprises an actuator 16, a four bar linkage 30 and a drive linkage 18. The system linkage 10 may further include a mechanical lock which may eliminate excessive load from an actuator 16 (shown as motor 32 in FIGS. 1-8) to the four bar linkage 30 and the active air dam 12. Moreover, the system linkage 10 may serve to protect the actuator 16 or motor 32 from damage that could be caused by any impacts/loads to the deployed air dam 12 given that the biasing means 52 or spring 50 may compress and therefore, prevent the transmission of energy from an applied load at the active air dam up to the sleeve 35 (having the spring 50 or biasing means 52) and up to the drive member 20. The load 68 applied to the active air dam 12 may be result of the road, animals, debris or the like. The system linkage 10 also provides a mechanical advantage such that actuator 16 may require lower torque and thereby reduce costs.

While exemplary embodiments are described above, it is not intended that these embodiments describe all possible forms of the invention. Rather the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle air dam assembly comprising:
   a motor and a support bracket configured to mount to a vehicle bumper;
   a drive member coupled to the motor and the support bracket at a proximal end of the drive member;
   a sleeve having an upper end that is pivotally coupled to a distal end of the drive member;
   a biasing member disposed in the sleeve and fixed upon an upper member of a four bar linkage; and
   an active air dam coupled to the biasing member and the sleeve via the four bar linkage.

2. The vehicle air dam assembly of claim 1 wherein the drive member is movable between a stowed position and a semi-locked deployed position.

3. The vehicle air dam assembly of claim 1 wherein the biasing member is operatively configured to absorb energy from a load when the drive member is in the semi-locked deployed position.

4. The vehicle air dam assembly of claim 3 wherein the biasing member is a spring.

5. The vehicle air dam assembly of claim 1, wherein the upper member is pivotally coupled to the support bracket, and the four bar linkage further comprises:
   a lower member pivotally coupled to the support bracket; and
   an aft member pivotally coupled to the upper member through a first pivot and pivotally coupled to the lower member through a second pivot.

6. The vehicle air dam assembly of claim 5, wherein the first pivot is slideably disposed in a slot of the sleeve to allow the four bar linkage to move relative to the sleeve and the drive member.

* * * * *